United States Patent [19]

Stubblefield

[11] Patent Number: 4,958,328

[45] Date of Patent: Sep. 18, 1990

[54] MARINE WALKAWAY VERTICAL SEISMIC PROFILING

[75] Inventor: Steven A. Stubblefield, Houston, Tex.

[73] Assignee: Texaco Inc., White Plains, N.Y.

[21] Appl. No.: 383,472

[22] Filed: Jul. 24, 1989

[51] Int. Cl.$^5$ .............................................. G01V 1/38
[52] U.S. Cl. ........................................ 367/15; 367/20; 367/57; 181/110
[58] Field of Search .................... 367/3, 15, 16, 20, 57, 367/154; 181/110

[56] References Cited

U.S. PATENT DOCUMENTS

| | | | |
|---|---|---|---|
| 3,372,368 | 3/1968 | Dale et al. | 367/15 |
| 3,737,841 | 6/1973 | Edson | 367/15 |
| 3,982,222 | 9/1976 | Urick | 367/58 |
| 4,254,480 | 3/1981 | French | 367/58 |

Primary Examiner—Charles J. Jordan
Assistant Examiner—J. Woodrow Eldred
Attorney, Agent, or Firm—Jack H. Park; Kenneth R. Priem; Robert A. Kulason

[57] ABSTRACT

Walkaway vertical seismic profiling is conducted in a body of water. A marine seismic cable is positioned substantially vertically in a body of water. The cable has a number of hydrophones spaced along its length. A seismic source is moved along a line of traverse past the seismic cable and is periodically activated to emit acoustic waves. The response of the hydrophones to reflection of the acoustic waves from subsurface formations is then recorded for processing and analysis.

11 Claims, 5 Drawing Sheets

MARINE WALKAWAY VERTICAL SEISMIC PROFILING

BACKGROUND OF THE INVENTION

1. Field of Invention:

The present invention relates to seismic surveying, namely marine walkaway vertical seismic profiling.

2. Description of Prior Art:

Walkaway vertical seismic profiling, or walkaway VSP, is a known technique of seismic surveying. It involves taking seismic data readings with a hydrophone at each one of various depths in a well borehole as a seismic source emits seismic waves at a number of shot-points along a seismic line of profile. Although the data obtained were useful, the technique has not been widely used. It could only be performed at locations where a well borehole had already been drilled. Additionally, VSP data acquisition was expensive since it required the seismic source be moved to each shot point along the entire line of profile several times to emit waves, once for each different hydrophone depth of interest in the well borehole.

SUMMARY OF INVENTION

Briefly, the present invention provides a new and improved method and apparatus for marine walkaway vertical seismic profiling. A marine seismic cable having plural hydrophones is located in a substantially vertical position in a body of water. A seismic source is then moved by being towed behind a marine vehicle along a traverse or line of profile past the seismic cable. As the source moves along the line of profile, it periodically emits seismic waves. The hydrophones in the cable sense the response of subsurface formations beneath the body of water to the emitted seismic waves. The responses or seismic data sensed by the hydrophones are sent by a transmitter attached to the cable. The transmitter is part of a digital telemetry system, the receiver of which is on the marine vessel. Once received, the seismic data are recorded so that they can be processed and analyzed.

DESCRIPTION OF PREFERRED EMBODIMENT

Figure 1:
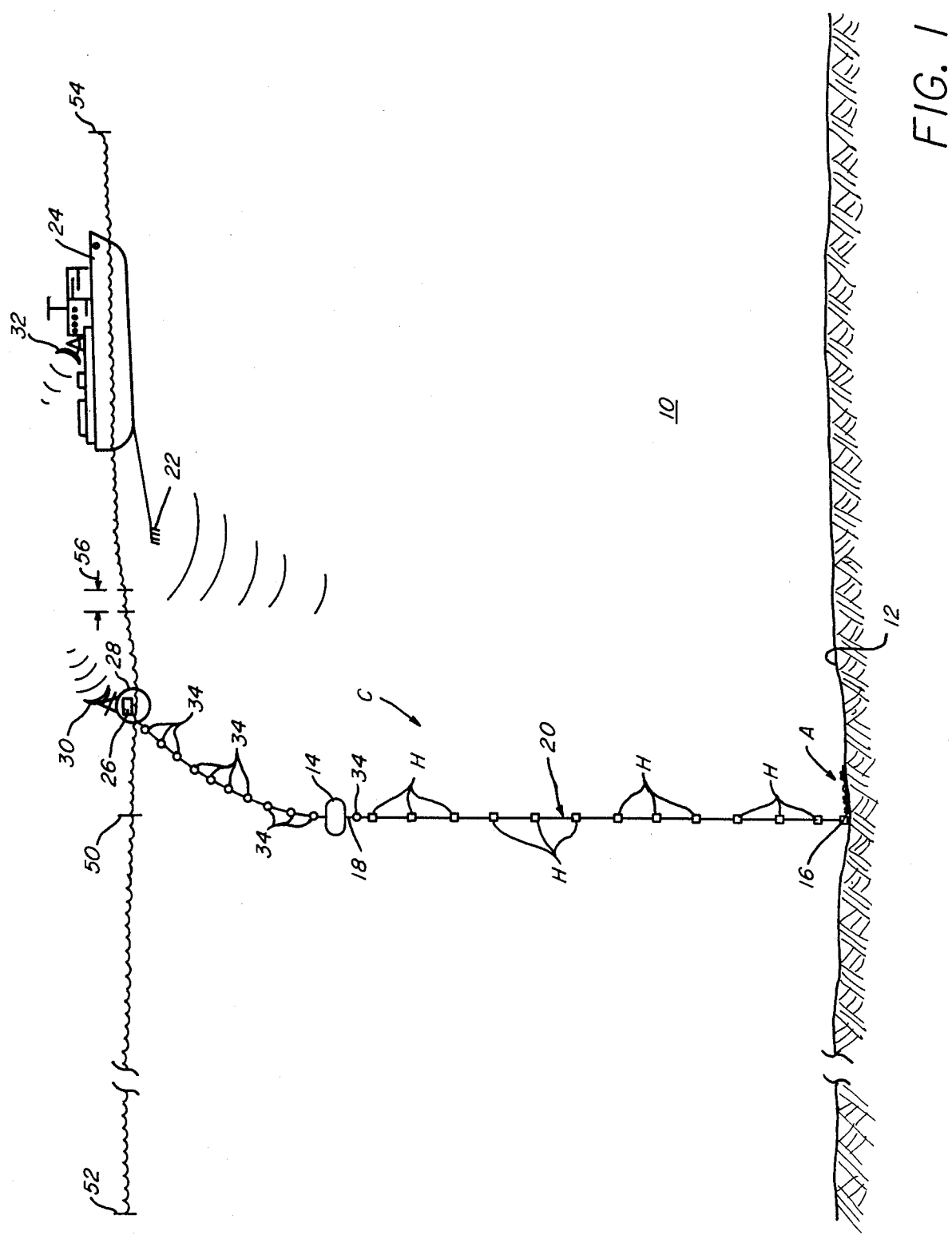
FIG. 1 is an elevation view of a marine walkaway vertical seismic profiling survey being performed, with a marine seismic cable, according to the present invention.

In the drawings, the letter C designates generally a marine seismic cable for walkaway vertical seismic profiling according to the present invention. The cable C is deployed in a substantially vertical position in a body of water 10, at least between an anchor mechanism A on a floor 12 of the body of water and a buoyant sphere 14 mounted with the cable C. The anchor A preferably is in the form of a suitable number of connected heavy chain links attached to the seismic cable C at a lower end 16. The chain links permit the cable C to be towed in the water to a new survey site without tangling with objects on the marine floor 12.

The buoyant sphere 14 is filled with a gas (usually air) and is of a size (two and one-half to three feet in diameter, for example) to displace sufficient water to maintain an adequate lifting force on the seismic cable C between an intermediate portion 18 where the sphere 14 is located and the lower end 16 to maintain a lower portion 20 in a substantially vertical position. The cable C serves a dual function, both as a mooring member and as a conductor of electrical signals. The cable C is not oil filled nor insulation jacketed.

The cable C is formed of a suitable number of stranded electrical conductors, based on the number of signals to be acquired, insulated with a coating of a suitable synthetic resin, such as an ethylene propylene copolymer. The conductors are formed in twisted pairs and coated with a synthetic resin such as polyurethane for mechanical protection.

Applied over the core of conductors is a jacket of synthetic fiber braid which serves to produce low stretch in the cable C and to provide strength thereto. Generally a nominal breaking strength of over 10,000 pounds is desirable. Applied over the braid is a thin jacket of a suitable polyester to which are attached a suitable number of rows of fringe-type fairing. The fairing eliminates low frequency cable strumming noise caused by the cable being moored vertically in the currents of the body of water 10.

A number of hydrophones H are mounted within the cable C in the lower portion 20 at spaced positions (100 feet, for example) along its length. Each of the hydrophones H is attached to a conductor pair in the cable C by bringing the conductor pair through the fiber braid and polyester jacket at the desired location. With suitable seals, the conductor pair is connected to the hydrophone. The hydrophones H are then installed in open-ended cylindrical sleeves which protect the hydrophones H from damage when the cable C is being deployed, retrieved or stored. The cylindrical sleeves with the hydrophones H are then secured to the cable C by tape or some other suitable attaching mechanism.

The hydrophones H are thus in a substantially vertical array and spaced from each other. The hydrophones H sense the response of subsurface earth formations beneath the marine floor 12 to seismic waves emitted from a seismic source 22, such as an air gun, towed behind a seismic exploration vessel 24. The hydrophones H convert the sensed responses to electrical signals in the form of seismic data.

Each of the hydrophones H is individually connected by an electrical conductor extending within the cable C to provide input data to a transmitter portion 26 of a conventional digital seismic telemetry system mounted with a surface buoy 28. The data so provided are then sent by a transmitting antenna 30 mounted on the surface buoy 28 to a receiving antenna 32 on the seismic exploration vessel 24 for provision to a receiver portion of the digital telemetry system for recording. The received seismic data is then recorded in the known manner for processing and analysis. The data may also be plotted and inspected as the survey is being performed, if desired.

In addition to the buoyant sphere 14, a number of smaller buoyancy floats 34 are mounted with the seismic cable C at spaced positions above the hydrophones H and below the surface buoy 28 to assist in controlling the buoyancy of the cable C. As can be seen in the drawings, the surface buoy 28 may be moved by wind and wave action at the surface from a location directly above the vertical cable C. However, the buoyancy sphere 14 and the anchor mechanism A maintain at least the lower portion 20 of the cable C containing the spaced hydrophones H in a substantially vertical position in the body of water 10.

In conducting marine walkaway vertical seismic profiling according to the present invention, the cable C is deployed in the body of water 10 with the anchor mechanism A on the marine floor 12 beneath a mid-point, indicated at 50, of a seismic line of profile which begins at a shot point 52 and ends at a shot point 54. The buoyancy sphere 14, with the aid of the buoyancy floats 34, maintains at least the lower portion 20 of the cable C in a substantially vertical position in the body of water 10.

The seismic vessel 24 then begins towing the seismic source 22 along the seismic line of profile at a substantially constant speed. The source 22 is then activated to emit seismic waves at periodic intervals corresponding to a suitable shot point spacing 56. An example shot point spacing could be, for example, 25 meters. The hydrophones H in the vertical seismic cable portion 20 sense the response of the subsurface formations to the emitted seismic waves and form data signals which are sent by the digital seismic telemetry system from the transmitting antenna 30 to the receiving antenna 32 on the vessel 24 for recording for subsequent processing and analysis. If desired, many parallel seismic lines of profiles can be recorded, to obtain three-dimensional imaging of the subsurface.

Figure 2:
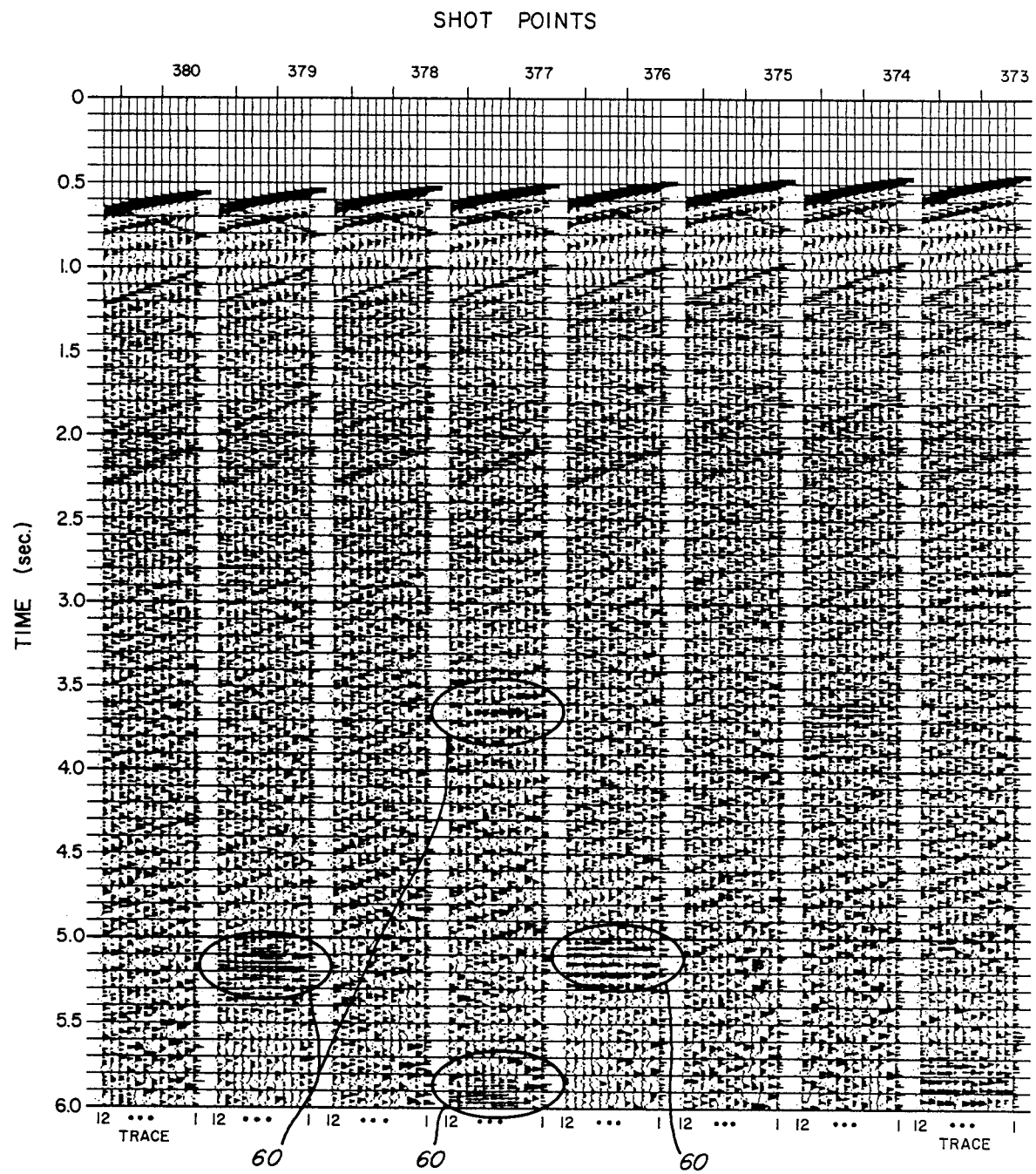
FIG. 2 is a plot of several adjacent seismic shot records obtained according to the present invention.

FIG. 2 in the drawings shows a group of adjacent shot records obtained according to the present invention after the data have been subjected to convention bandpass filtering and automatic gain control. It is to be noted that the records exhibit the typical crisscross patterns of upgoing and downgoing waves of vertical seismic profiling records. There are certain anomalous noise bursts in the data of FIG. 2 which are indicated in circled portions designated 60 which were caused by an interfering seismic boat within the area where marine walkaway vertical seismic profiling according to the present invention was being performed.

Figure 3:
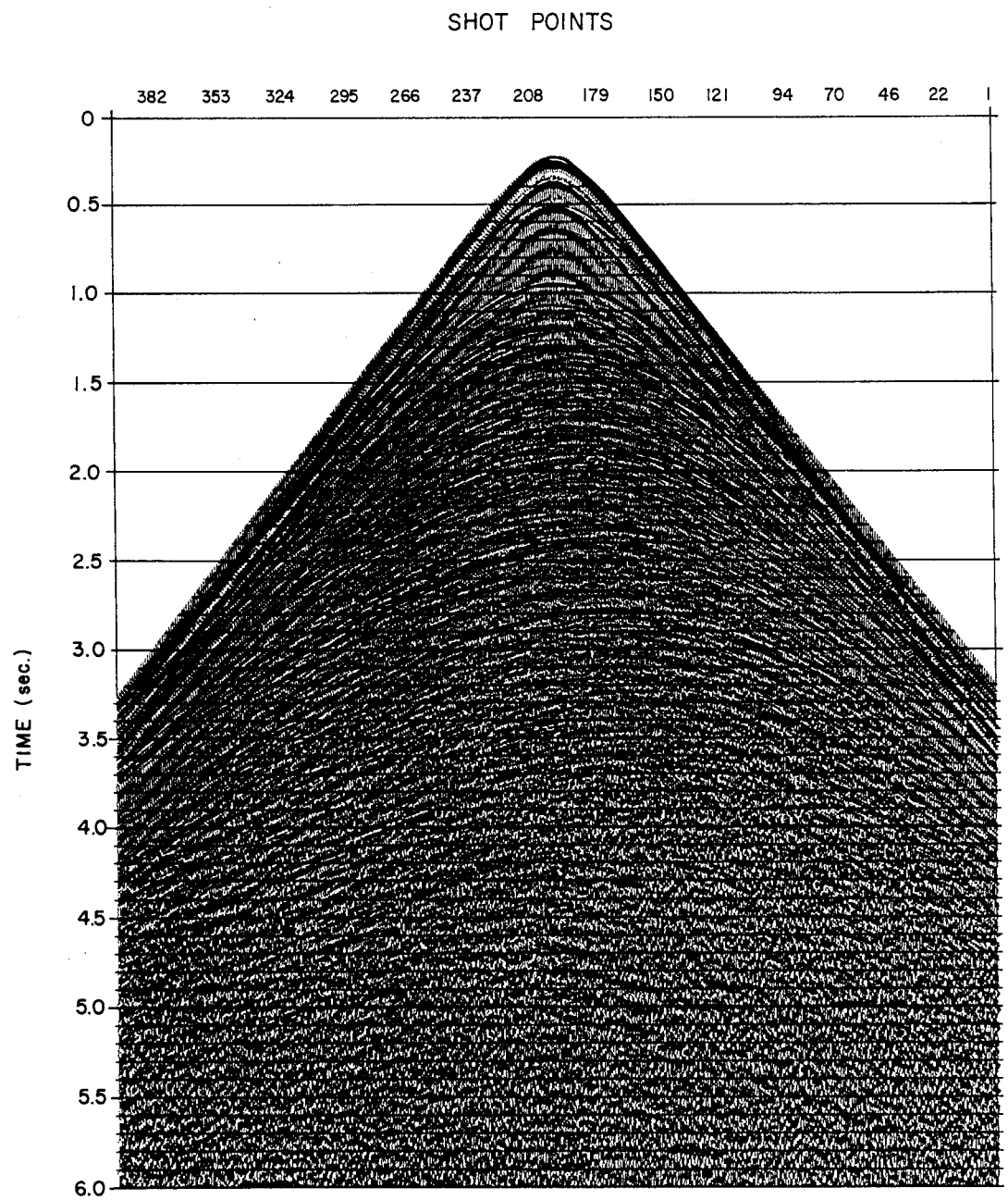
FIG. 3 is a plot of a hydrophone gather from a single hydrophone in the cable of FIG. 1 for each shot point in the survey of FIG. 1.

FIG. 3 in the drawings is a hydrophone gather of a lowermost hydrophone in a cable C according to the present invention at a depth of approximately 1100 feet in a body of water. The gather of FIG. 3 is composed of approximately 400 traces, one from each shot point at a spacing of 25 meters along a seismic line of profile of ten kilometers traversed by the seismic exploration vessel 24.

Figure 4:
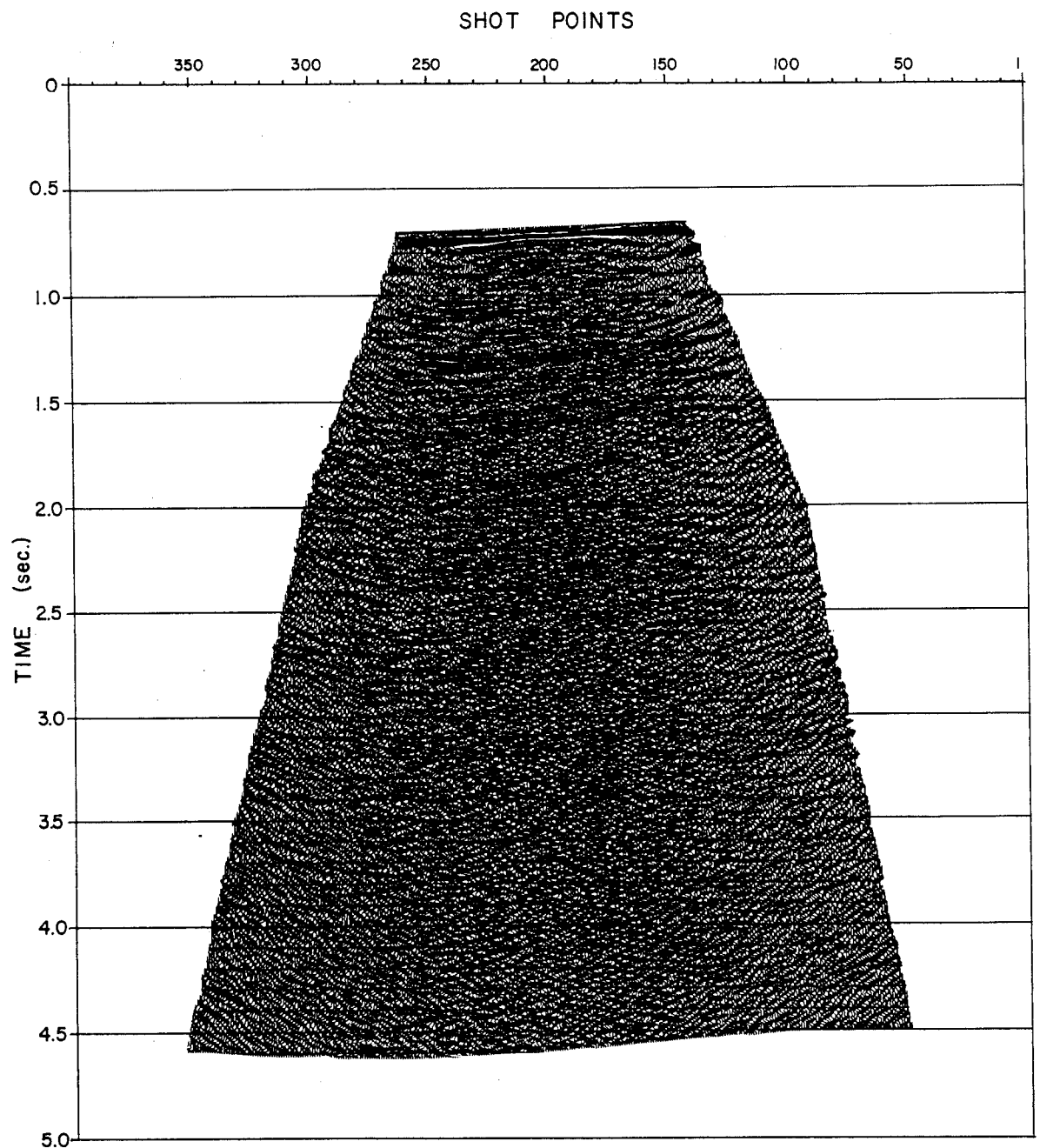
FIG. 4 is a migrated seismic section of the hydrophone gather of FIG. 3.
Figure 5:
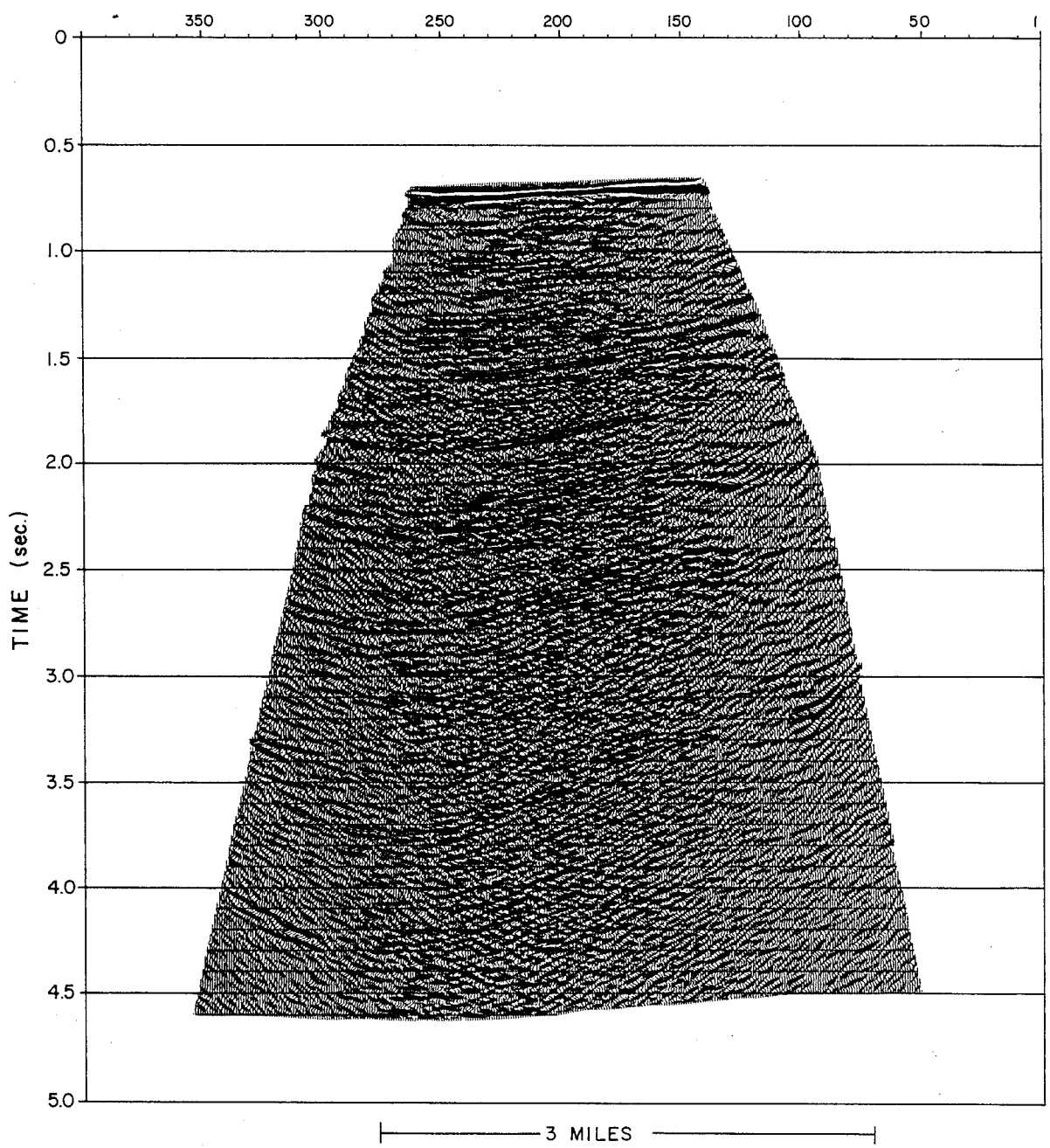
FIG. 5 is a seismic section of stacked data from a number of migrated seismic sections like that of FIG. 4.

FIG. 4 shows the result of processing the hydrophone gather of FIG. 3 by a conventional migration process appropriate for walkaway VSP profiling. Migrated sections of the type of FIG. 4 were obtained for each of twelve hydrophones H in a vertical seismic cable C according to the present invention. The twelve migrated sections were then stacked. FIG. 5 shows the stacked final image of the twelve migrated hydrophone gathers of the type of FIG. 4. The stack of data in this manner has the effect of cancelling interfering waves and of increasing the signal-to-noise ratio in the data. As can be seen, FIG. 5 provides an accurate, high-quality image of the subsurface earth features beneath a body of water.

The foregoing disclosure and description of the invention are illustrative and explanatory thereof, and various changes in the size, shape and materials, as well as in the details of the illustrated construction may be made without departing from the spirit of the invention.

I claim:

1. A method of marine vertical seismic profiling, comprising the steps of:
    (a) locating a marine seismic cable having plural hydrophones in a substantially vertical position in a body of water;
    (b) towing a seismic source behind a vessel along a seismic line of profile past the seismic cable;
    (c) activating the seismic source at periodic intervals corresponding to shotpoint intervals to emit seismic waves into subsurface formations beneath the body of water;
    (d) sensing the response of the subsurface formations to the emitted seismic waves with the plural hydrophones; and
    (e) recording the sensed response of the hydrophones as seismic data.

2. The method of claim 1, wherein said step of locating comprises:
    locating a marine seismic cable having plural vertically spaced hydrophones in a substantially vertical position in a body of water.

3. The method of claim 1, further including the step of:
    anchoring the marine seismic cable on the floor of the body of water.

4. The method of claim 1, further including the step of:
    controlling the buoyancy of the marine seismic cable along its vertical extent in the body of water.

5. The method of claim 1, further including the step of:
    controlling the buoyancy of the marine seismic cable between its upper and lower ends in the body of water.

6. The method of claim 5, wherein the upper end of the cable is at the surface of the body of water.

7. The method of claim 5, wherein the lower end of the cable is at the floor of the body of water.

8. The method of claim 1, further including the step of:
    positioning a buoyancy sphere on the marine seismic cable above the hydrophones.

9. The method of claim 1, further including the step of:
    positioning a plurality of buoyancy floats at spaced positions on the marine seismic cable above the hydrophones.

10. The method of claim 1, further including the step of:
    positioning a buoy having a transmitter, at an upper end of the marine seismic cable, for the response of the subsurface formations to the emitted seismic waves sensed by the plural hydrophones.

11. The method of claim 10 further including the steps of:
    transmitting the response of the subsurface formations to the emitted seismic waves sensed by the plural hydrophones from the transmitter; and
    receiving the transmitted response of the subsurface formations to the emitted seismic waves sensed by the plural hydrophones prior to said step of recording.

* * * * *